FRANCIS HICKMAN.
Improvement in Bases for Artificial Teeth.

No. 126,809.                        Patented May 14, 1872.

ATTEST                                  INVENTOR

Walter Allen                         Francis Hickman
Wm H Brereton Jr              By Knight Bros
                                                        Attys

AM. PHOTO-LITHOGRAPHIC CO. N.Y. (OSBORNE'S PROCESS.)

UNITED STATES PATENT OFFICE.

FRANCIS HICKMAN, OF READING, PENNSYLVANIA.

IMPROVEMENT IN BASES FOR ARTIFICIAL TEETH.

Specification forming part of Letters Patent No. 126,809, dated May 14, 1872; antedated April 30, 1872.

Specification of an Improvement in Dental Plates, invented by FRANCIS HICKMAN, of Reading, in the county of Berks and State of Pennsylvania.

My invention consists in an improved mode of securing to dental plates a projecting lip or edge of flexible soft rubber or analogous material.

In order to adapt dental plates to fit with greater ease and security in the mouth projecting edges of soft rubber have been applied thereto or formed thereon in various ways. For example, Henry Twitchell, of Pulaski, New York, obtained a patent on the 6th of April, 1869, for applying to a base of vulcanite or other hard material a thin sheet of rubber to form a lining on the surface next the mouth to prevent irritation and give better adhesion. This soft rubber may extend beyond the edges of the hard plate to form a projecting flexible lip. A patent was also granted on the 23d of November, 1869, to John A. Straight, of Albion, New York, for constructing the edge of a vulcanite denture of soft rubber or analogous material. This is done by packing the proper part of the mold with a rubber that will not harden in vulcanizing.

From the above explanation it will be perceived that the novelty in my invention does not consist broadly in constructing vulcanite or other hard plates with flexible lips; but, in using plates with flexible lips as heretofore constructed, I have found great inconvenience from the impossibility of repairing them when injured by wear or otherwise.

My invention consists in combining with the soft-rubber strip, by which the projecting lip is formed, a metallic plate on one or both sides of said strip, by means of which additional plate the lip is fastened to the dental plate securely, but in such a manner as to admit of its being readily renewed and replaced when needful.

The attachment of the said supplemental or holding plate is effected by riveting, as hereinafter described.

Figure 1:
Figure 2:
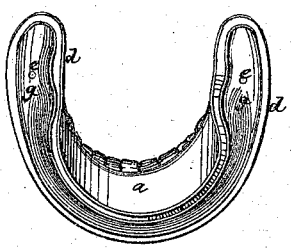
Figure 3:
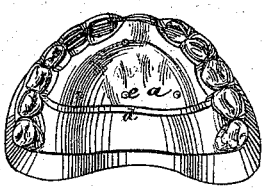
Figure 4:
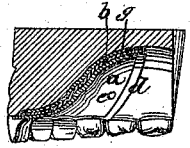

In the drawing, Figure 1 is a view of a lower denture in section. Fig. 2 is an under-side view of same. Fig. 3 is an under-side view of a partial upper denture. Fig. 4 is a section of the denture, Fig. 3, showing also the form or pattern to which the plate is fitted.

The strips are adapted to cast or plate-metal bases, or those of vulcanite or celluloid. The plates $a$ and $g$ inclosing the thin sheet of rubber $b\ b$ are screwed or riveted together, and may be detached to replace the rubber with little trouble or cost.

Referring to the drawing I may describe the operation as follows: First make a base, $a$, of rubber or any suitable metal or composition; then strike up a plate, $g$, of any suitable metal, in the requisite form to fit the part of the mouth to which it is to be applied; next place a soft thin rubber strip between the plate and base, and secure them together by screws or rivets $e$, leaving a small edge of the soft rubber projecting around the outside, as shown in the drawing at $d\ d$. This plan is also adapted to Allen's patent "Continuous Gem Work," made on platinum where the teeth are burned fast to the plate. It can also be used by striking up two plates, of gold or silver, and then screwing or riveting the loose plate to the one that has the teeth attached to it. It is adapted for partial or full sets. The intervention of the elastic strip between the edge of the plate and the necks of the teeth, as seen in Figs. 3 and 4, secures the latter against wear.

I claim as my invention—

The combination of the flexible-rubber strip and lip $b\ d$ and attaching plate $g$, secured to the base $a$ by screws or rivets $e$.

FRANCIS HICKMAN.

Witnesses:
WM. H. BRERETON, Jr.,
WALTER ALLEN.